(12) United States Patent
Chan

(10) Patent No.: US 10,788,100 B2
(45) Date of Patent: Sep. 29, 2020

(54) CORD FASTENER

(71) Applicant: Duraflex Hong Kong Limited, Hong Kong (CN)

(72) Inventor: Yick Fai Chan, Hong Kong (CN)

(73) Assignee: Duraflex Hong Kong Limited, Hong Kong (CN)

(*) Notice: Subject to any disclaimer, the term of this patent is extended or adjusted under 35 U.S.C. 154(b) by 38 days.

(21) Appl. No.: 16/404,937

(22) Filed: May 7, 2019

(65) Prior Publication Data

US 2019/0360554 A1 Nov. 28, 2019

(30) Foreign Application Priority Data

May 25, 2018 (CN) .......................... 2018 1 0516061

(51) Int. Cl.
*F16G 11/10* (2006.01)

(52) U.S. Cl.
CPC ..................... *F16G 11/10* (2013.01)

(58) Field of Classification Search
CPC ............ Y10T 24/3916; Y10T 24/3984; Y10T 24/3969; F16G 11/10; F16G 11/101; F16M 13/02; F16M 11/041
See application file for complete search history.

(56) References Cited

U.S. PATENT DOCUMENTS

| 4,675,948 A * | 6/1987 | Bengtsson | F16B 2/22 24/115 G |
| 5,451,082 A * | 9/1995 | Murai | E05B 65/523 24/115 G |
| 5,702,388 A * | 12/1997 | Jackson | A61B 17/685 24/115 G |
| 6,654,989 B2 * | 12/2003 | Hamai | A41F 1/008 24/38 |
| 6,658,704 B2 * | 12/2003 | Buscart | F16G 11/101 24/115 G |
| 6,775,928 B2 * | 8/2004 | Grande | A43C 7/00 24/115 G |
| 7,257,865 B2 * | 8/2007 | Kaneko | A44B 99/00 24/115 G |
| 7,415,750 B2 * | 8/2008 | Kinebuchi | F16G 11/101 24/115 G |
| 8,424,169 B2 * | 4/2013 | Gammell | A43C 1/00 24/115 G |
| 8,997,314 B2 * | 4/2015 | Kawaguchi | A43C 11/00 24/115 G |
| 9,265,294 B2 * | 2/2016 | Ellis | A41D 1/002 |
| 9,307,808 B1 * | 4/2016 | Lill | A44B 11/2584 |

FOREIGN PATENT DOCUMENTS

WO 2010-J41381 * 7/2010

* cited by examiner

*Primary Examiner* — Robert Sandy
*Assistant Examiner* — Louis A Mercado
(74) *Attorney, Agent, or Firm* — Collard & Roe, P.C.

(57) ABSTRACT

A cord fastener has a cord fastener main body and a bottom plate provided with at least two linear sliding holes, and a first bulge formed on an inner wall of a sliding terminal of the sliding hole. The linear sliding holes are arranged such that distances from two end faces of the bottom plate respectively to the first bulge are different. At least two fixing feet are provided on the cord fastener main body and the fixing foot is provided with a second bulge configured to abut the first bulge after the fixing foot passes through a positioning hole in a piece of cloth and the corresponding sliding hole in the bottom plate in sequence.

7 Claims, 3 Drawing Sheets

CORD FASTENER

CROSS-REFERENCE TO RELATED APPLICATIONS

This application claims priority under 35 USC 119 of Chinese Application No. 201810516061.1, filed on May 25, 2018, the disclosure of which is herein incorporated by reference.

BACKGROUND OF THE INVENTION

Technical Field

The present invention relates to the field of connection structures, and in particular, to a cord fastener.

Background Art

A cord fastener is a fastener for fastening a cord and comprises a female fastener part and a male fastener part. The female fastener part comprises a cord retaining seat provided with an opening and a bottom plate. The cord retaining seat and the bottom plate are respectively engaged with surfaces on two sides of a piece of cloth, and are then correspondingly assembled with each other to form a through channel together with a through hole of the piece of cloth. The male fastener part is provided with an opening conforming to the through channel, which has an elastic retaining function. When the male fastener part is subjected to an external pressure, the opening thereof will be aligned with the through channel and the cord can pass through the opening. After the external pressure is released, the opening of the male fastener part will deviate from the through channel and a channel path will be reduced so as to lock the cord. In this conventional design, the cord fastener main body (i.e. the part comprising the cord retaining seat) and the bottom plate are usually fixed by fitting a column with a hole, so that only the piece of cloth of a certain thickness can be fixed; and at the same time, the cord fastener main body and the bottom plate can hardly be disassembled after being fixed, which is not conducive to replacement.

SUMMARY OF THE INVENTION

An object of the present invention is to provide a cord fastener that solves the above technical problems.

The technical solutions proposed by the present invention are as follows:

The present invention proposes a cord fastener, comprising a cord fastener main body and a bottom plate having at least two linear sliding holes. A first bulge is formed on an inner wall of a sliding terminal of the sliding hole. The first bulge is arranged such that the distances from two end faces of the bottom plate respectively to the first bulge are different. There are at least two fixing feet provided on the cord fastener main body, and the fixing foot is provided with a second bulge configured to be abutted against the first bulge after the fixing foot passes through a positioning hole in a piece of cloth and the corresponding sliding hole in the bottom plate in sequence.

In the cord fastener of the present invention, a plurality of friction pegs are formed on a surface of the cord fastener main body where the fixing feet are provided.

In the cord fastener of the present invention, the first bulge and the second bulge are both flanges, or the first bulge is a flange and the second bulge is a bump, or the first bulge is a bump and the second bulge is a flange.

In the cord fastener of the present invention, the cord fastener main body is provided with a first through hole, and a middle position between the two sliding holes of the bottom plate is provided with a second through hole arranged opposite the first through hole when the fixing feet of the cord fastener main body pass through the corresponding sliding holes.

In the cord fastener of the present invention, the cord fastener main body comprises a female fastener part; the fixing feet and the first through hole are both arranged on the female fastener part; the female fastener part is further provided with a fourth through hole in communication with the first through hole. The cord fastener main body further comprises a male fastener part which is telescopically arranged in the fourth through hole via a spring; and the male fastener part is provided with a fifth through hole. When the male fastener part is subjected to a pressing action, the fifth through hole thereof is in communication with the first through hole.

The present invention further proposes a cord fastener, comprising a cord fastener main body and a bottom plate having at least two linear sliding notches and a first bulge formed on an inner wall of a sliding terminal of the sliding notch. The first bulge is arranged such that the distances from two end faces of the bottom plate respectively to the first bulge are different. At least two fixing feet are provided on the cord fastener main body, and the fixing foot is further provided with a second bulge configured to be abutted against the first bulge after the fixing foot passes through a positioning hole in a piece of cloth and the corresponding sliding notch in the bottom plate in sequence.

In the cord fastener of the present invention, the first bulge and the second bulge are both flanges, or the first bulge is a flange and the second bulge is a bump, or the first bulge is a bump and the second bulge is a flange.

In the cord fastener of the present invention, the cord fastener main body is provided with a first through hole; and the bottom plate has a second through hole located at a middle position between the two sliding notches and arranged opposite the first through hole when the fixing feet of the cord fastener main body pass through the corresponding sliding notches.

In the cord fastener of the present invention, the cord fastener main body comprises a female fastener part and a male fastener part. The fixing feet and the first through hole are both arranged on the female fastener part and the female fastener part is further provided with a fourth through hole in communication with the first through hole. The male fastener part is telescopically arranged in the fourth through hole via a spring and is provided with a fifth through hole. When the male fastener part is subjected to a pressing action, the fifth through hole is in communication with the first through hole.

In the cord fastener of the present invention, a hole in the bottom plate is designed such that the conventional point fixing hole is changed into a linear sliding hole or a linear sliding notch, so as to change the method for mounting the fixing feet on the cord fastener main body and the bottom plate. At the same time, a first bulge is provided on a sliding terminal of the linear sliding hole or the linear sliding notch to fix the fixing foot of the cord fastener main body. In addition, the goal of fixing pieces of cloth of different thicknesses can be achieved by means of the cord fastener main body and the bottom plate due to the different distances from the first bulge to two end faces of the bottom plate. The cord fastener of the invention has a clever design and strong practicability.

BRIEF DESCRIPTION OF THE DRAWINGS

The present invention will be further explained below in conjunction with the accompanying drawings and embodiments. In the accompanying drawings.

DETAILED DESCRIPTION OF EMBODIMENTS

The present invention overcomes the drawbacks of the conventional design of the cord fastener, where the cord fastener main body and the bottom plate are usually fixed by fitting a column with a hole, so that only the piece of cloth of a certain thickness can be fixed; and at the same time, the cord fastener main body and the bottom plate can hardly be disassembled after being fixed, which is not conducive to replacement. The present invention overcomes this drawback in that a hole in the bottom plate is designed such that the conventional point fixing hole is changed into a linear sliding hole or a linear sliding notch, so as to change the method for mounting the fixing feet on the cord fastener main body and the bottom plate. At the same time, a first bulge is provided on a sliding terminal of the linear sliding hole or the linear sliding notch to fix the fixing foot of the cord fastener main body. In addition, the purpose of fixing pieces of cloth of different thicknesses can be achieved by means of the cord fastener main body and the bottom plate due to the different distances from the first bulge to two end faces of the bottom plate.

In order to make the technical object, technical solutions and technical effects of the present invention more apparent and to enable a person skilled in the art to understand and implement the present invention, the present invention will be further described in detail below with reference to the accompanying drawings and specific embodiments.

First Embodiment

Figure 1:
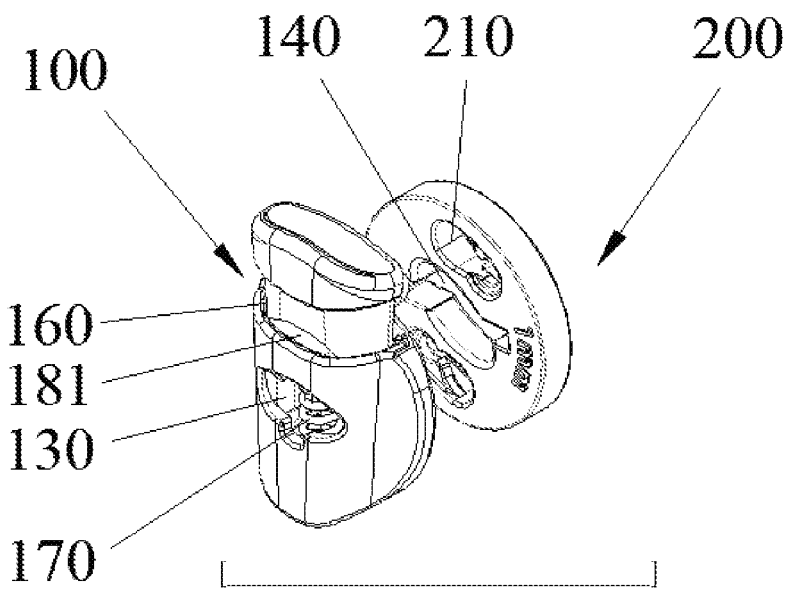
FIG. 1 shows a structural schematic explosion diagram of a cord fastener of a first embodiment of the present invention.
Figure 2:
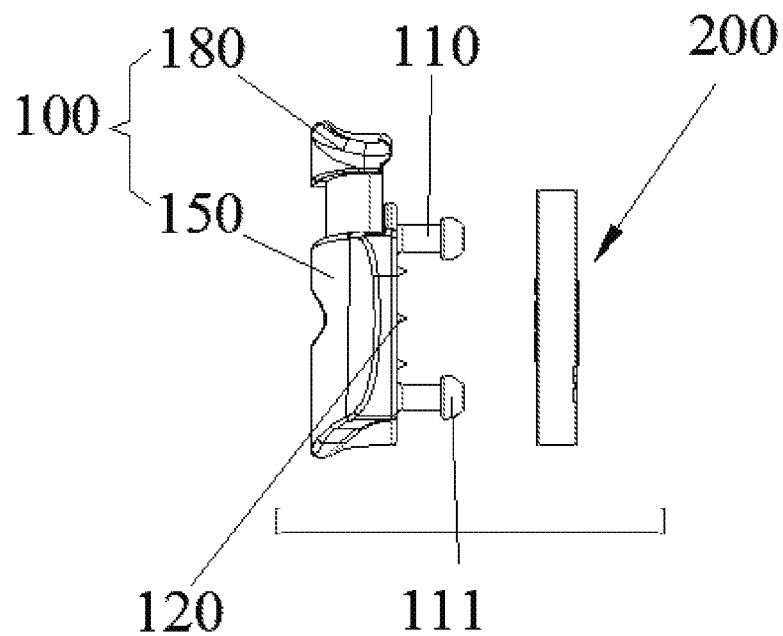
FIG. 2 shows a schematic diagram of the cord fastener shown in FIG. 1 viewed in another direction.
Figure 3:
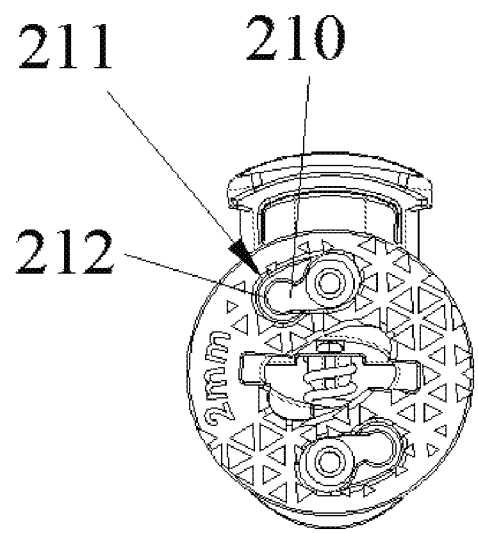
FIG. 3 shows a schematic diagram of the cord fastener shown in FIG. 1 viewed in still another direction.

As shown in FIGS. 1 to 3, FIG. 1 shows a structural schematic exploded diagram of a cord fastener of a first embodiment of the present invention; FIG. 2 shows a schematic diagram of the cord fastener shown in FIG. 1 viewed in another direction; and FIG. 3 shows a schematic diagram of the cord fastener shown in FIG. 1 viewed in still another direction. The cord fastener comprises a cord fastener main body 100 and a bottom plate 200, wherein the bottom plate 200 is provided with at least two linear sliding holes 210. The linear sliding hole 210 here may be in the shape of a short straight line or a curved line. A first bulge 212 is formed on an inner wall of a sliding terminal 211 of the sliding hole 210. The distances from two end faces of the bottom plate 200 respectively to the first bulge 212 are different. At least two fixing feet 110 are provided on the cord fastener main body 100, and the fixing foot 110 is provided with a second bulge 111 configured to be abutted against the first bulge 212 after the fixing foot 110 passes through a positioning hole (not shown) in a piece of cloth (not shown) and the corresponding sliding hole 210 in the bottom plate 200 in sequence. Here, the first bulge 212 abuts the second bulge 111 by means of the thickness of the piece of cloth. The fixed fit of the fixing foot 110 with the sliding hole 210 can be implemented by means of the abutting fit of the first bulge 212 with the second bulge 111. Moreover, the firm fixing of the cord fastener main body 100 and the bottom plate 200 can be implemented by fixing of at least two fixing feet 110 and the corresponding sliding holes 210. At the same time, since the distances from the two end faces of the bottom plate 200 respectively to the first bulge 212 are different, when the two end faces of the bottom plate 200 respectively face toward and are fixed to the cord fastener main body 100, pieces of cloth of different thicknesses can be respectively sandwiched. In this way, the cord fastener of the present invention can be suitable for pieces of cloth of different thicknesses. Since the bottom plate 200 can be used with both sides, the female fastener part can be fastened when the bottom plate is rotated clockwise for one side is rotated, and counterclockwise for the other side.

Further, in this embodiment, the first bulge 212 and the second bulge 111 are both flanges; and in other embodiments, the first bulge 212 is a flange, and the second bulge 111 is a bump; or the first bulge 212 is a bump, and the second bulge 111 is a flange.

Further, in this embodiment, a number of friction pegs 120 are formed on a surface of the cord fastener main body 100 where the fixing feet 110 are provided. When the fixing feet 110 pass through the positioning holes in the piece of cloth, the surface of the cord fastener main body 100 where the fixing feet 110 are provided is attached to the piece of cloth, and the number of friction pegs 120 are engaged with the piece of flexible cloth, so as to avoid relative rotation of the cord fastener main body 100 and the piece of cloth.

Further, the cord fastener main body 100 is provided with a first through hole 130; and a middle position between the two sliding holes 210 of the bottom plate 200 is provided with a second through hole 140 arranged opposite the first through hole 130 when the fixing feet 110 of the cord fastener main body 100 pass through the corresponding sliding holes 210. When the fixing foot 110 passes through the positioning hole in the piece of cloth and the sliding hole 210 in the bottom plate 200 in sequence, and the second bulge 111 is abutted against the first bulge 212, the first through hole 130, the second through hole 140, and a third through hole in the piece of cloth together form a through channel for the cord to pass through.

Further, the cord fastener main body 100 comprises a female fastener part 150, wherein the fixing feet 110, the friction pegs 120, and the first through hole 130 are all arranged on the female fastener part 150. The female fastener part 150 is further provided with a fourth through hole 160 in communication with the first through hole 130. The cord fastener main body 100 further comprises a male fastener part 180 which is telescopically arranged in the fourth through hole 160 via a spring 170, and the male fastener part 180 is provided with a fifth through hole 181. When the male fastener part 180 is subjected to a pressing action, the fifth through hole 181 thereof is in communication with the first through hole 130, so that the entire through channel is continuing, and the cord may be allowed to pass through the through channel. Moreover, after the pressing action is released, the male fastener part 180 is jacked up by means of the elastic force from the spring 170, and the fifth through hole 181 is deviated from the first through hole 130 such that the aperture of the through channel between the fifth through hole 181 and the first through hole 130 is reduced, so as to lock the cord.

Second Embodiment

The second embodiment differs from the first embodiment only in that the linear sliding hole 210 is replaced by a linear sliding notch 220 and there are no friction pegs 120.

Figure 4:
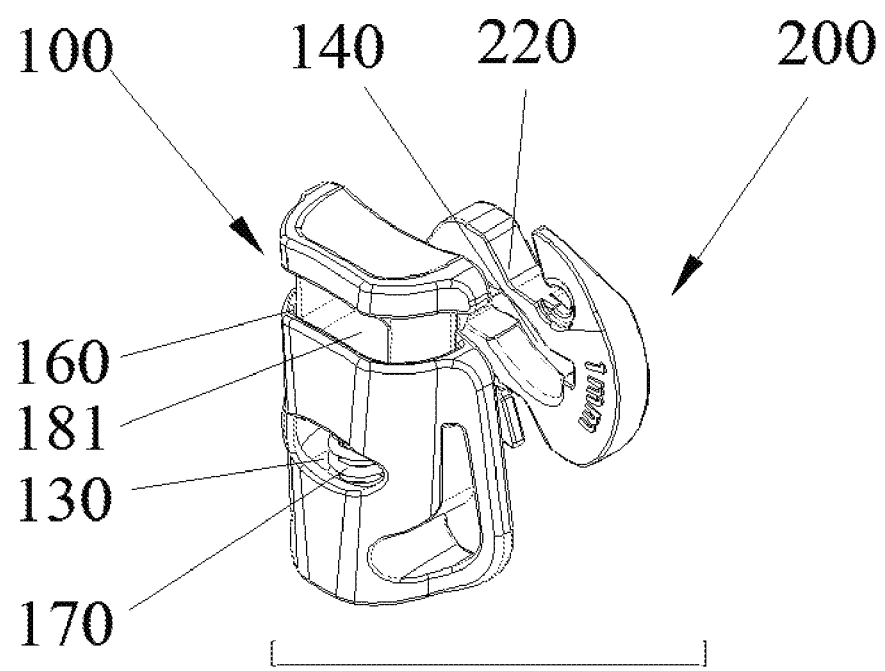
FIG. 4 shows a structural schematic explosion diagram of a cord fastener of a second embodiment of the present invention.
Figure 5:
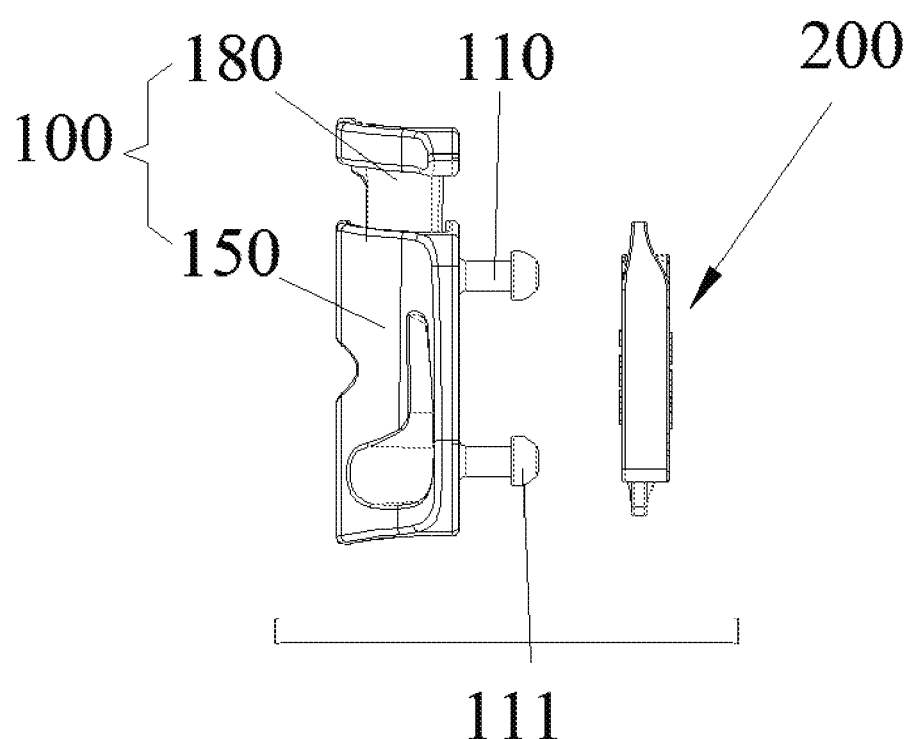
FIG. 5 shows a schematic diagram of the cord fastener shown in FIG. 4 viewed in another direction.
Figure 6:
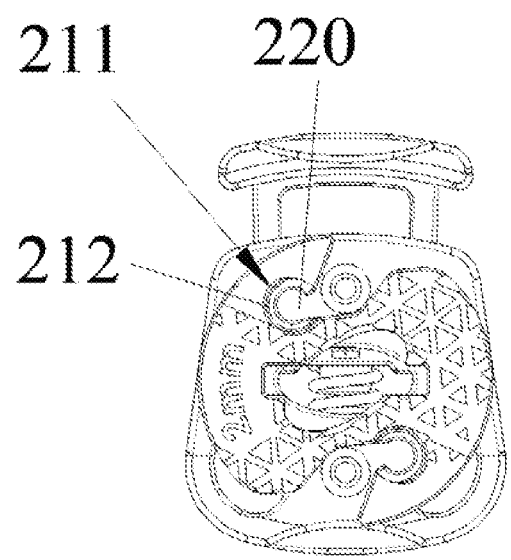
FIG. 6 shows a schematic diagram of the cord fastener shown in FIG. 4 viewed in still another direction.

As shown in FIGS. 4 to 6, FIG. 4 shows a structural schematic explosion diagram of a cord fastener of the second embodiment of the present invention. FIG. 5 shows a schematic diagram of the cord fastener shown in FIG. 4 viewed in another direction, and FIG. 6 shows a schematic diagram of the cord fastener shown in FIG. 4 viewed in still another direction. The cord fastener comprises a cord fastener main body 100 and a bottom plate 200, wherein the bottom plate 200 is provided with at least two linear sliding notches 220. The linear sliding notch 220 here may be in the shape of a short straight line or a curved line. A first bulge 212 is formed on an inner wall of a sliding terminal 211 of the sliding notch 220. The distances from two end faces of the bottom plate 200 respectively to the first bulge 212 are different. At least two fixing feet 110 are provided on the cord fastener main body 100, and the fixing foot 110 is provided with a second bulge 111 configured to be abutted against the first bulge 212 after the fixing foot 110 passes through a positioning hole (not shown) in a piece of cloth (not shown) and a corresponding sliding notch 220 in the bottom plate 200 in sequence. Here, the first bulge 212 abuts the second bulge 111 by means of the thickness of the piece of cloth. The fixed fit of the fixing foot 110 with the sliding notch 220 can be implemented by means of the abutting fit of the first bulge 212 with the second bulge 111. Moreover, the firm fixing of the cord fastener main body 100 and the bottom plate 200 can be implemented by means of the fixing of at least two fixing feet 110 and the corresponding sliding notches 220. At the same time, since the distances from the two end faces of the bottom plate 200 respectively to the first bulge 212 are different, when the two end faces of the bottom plate 200 respectively face toward and are fixed to the cord fastener main body 100, pieces of cloth of different thicknesses can be respectively sandwiched. In this way, the cord fastener of the present invention can be suitable for pieces of cloth of different thicknesses. Since the bottom plate 200 can be used with both sides, the female fastener part can be fastened when the bottom plate is rotated clockwise for one side is rotated, and counterclockwise for the other side.

Further, in this embodiment, the first bulge 212 and the second bulge 111 are both flanges; and in other embodiments, the first bulge 212 is a flange, and the second bulge 111 is a bump; or the first bulge 212 is a bump, and the second bulge 111 is a flange.

Further, the cord fastener main body 100 is provided with a first through hole 130 and a middle position between the two sliding notches 220 of the bottom plate 200 is provided with a second through hole 140 arranged opposite the first through hole 130 when the fixing feet 110 of the cord fastener main body 100 pass through the corresponding sliding notches 220. When the fixing foot 110 passes through the positioning hole in the piece of cloth and the sliding notch 220 in the bottom plate 200 in sequence, and the second bulge 111 is abutted against the first bulge 212, the first through hole 130, the second through hole 140, and a third through hole in the piece of cloth together form a through channel for the cord to pass through.

Further, the cord fastener main body 100 comprises a female fastener part 150, wherein the fixing feet 110 and the first through hole 130 are both arranged on the female fastener part 150. The female fastener part 150 is further provided with a fourth through hole 160 in communication with the first through hole 130. The cord fastener main body 100 further comprises a male fastener part 180 which is telescopically arranged in the fourth through hole 160 via a spring 170, and the male fastener part 180 is provided with a fifth through hole 181. When the male fastener part 180 is subjected to a pressing action, the fifth through hole 181 thereof is in communication with the first through hole 130, so that the entire through channel is continuing, and the cord may be allowed to pass through the through channel. Moreover, after the pressing action is released, the male fastener part 180 is jacked up by means of the elastic force from the spring 170, and the fifth through hole 181 is deviated from the first through hole 130 such that the aperture of the through channel between the fifth through hole 181 and the first through hole 130 is reduced, so as to lock the cord.

It should be understood that a person skilled in the art could make modifications or variations in accordance with the above description, and all such modifications and variations are intended to be included within the scope of protection of the appended claims of the present invention.

What is claimed is:

1. A cord fastener, comprising:
   a cord fastener main body,
      a bottom plate having at least two linear sliding holes and a first bulge formed on an inner wall of a sliding terminal of a first one of the sliding holes, wherein distances from two end faces of the bottom plate respectively to the first bulge are different, and
      at least two fixing feet provided on the cord fastener main body, one of the at least two fixing feet having a second bulge configured to abut the first bulge after said one fixing foot passes through a positioning hole in a piece of cloth and a corresponding one of the sliding holes in the bottom plate in sequence,
   wherein a plurality of friction pegs are formed on a surface of the cord fastener main body where the fixing feet are located.

2. The cord fastener according to claim 1, wherein the first bulge and the second bulge are both flanges, or the first bulge is a flange, and the second bulge is a bump, or the first bulge is a bump, and the second bulge is a flange.

3. A cord fastener, comprising:
   a cord fastener main body,
   a bottom plate having at least two linear sliding holes and a first bulge formed on an inner wall of a sliding terminal of a first one of the sliding holes, wherein distances from two end faces of the bottom plate respectively to the first bulge are different, and
   at least two fixing feet provided on the cord fastener main body, one of the at least two fixing feet having a second bulge configured to abut the first bulge after said one fixing foot passes through a positioning hole in a piece of cloth and a corresponding one of the sliding holes in the bottom plate in sequence,
   wherein the cord fastener main body has a first through hole, wherein the bottom plate has a second through hole arranged in a middle position between the two sliding holes and opposite the first through hole when the fixing feet of the cord fastener main body pass through the corresponding sliding holes.

4. The cord fastener according to claim 3, wherein the cord fastener main body comprises a female fastener part, and a male fastener part, wherein the fixing feet and the first through hole are both arranged on the female fastener part, wherein the female fastener part has a fourth through hole in communication with the first through hole, wherein the male fastener part which is telescopically arranged in the fourth through hole via a spring, wherein the male fastener part is provided with a fifth through hole, and wherein when the male fastener part is subjected to a pressing action, the fifth through hole is in communication with the first through hole.

5. A cord fastener comprising:
a cord fastener main body, and
a bottom plate having at least two linear sliding notches and a first bulge formed on an inner wall of a sliding terminal of one of the sliding notches, wherein distances from two end faces of the bottom plate respectively to the first bulge are different, and
at least two fixing feet disposed on the cord fastener main body, one of the at least two fixing feet having a second bulge configured to abut the first bulge after the one fixing foot passes through a positioning hole in a piece of cloth and the corresponding sliding notch in the bottom plate in sequence, wherein the cord fastener main body has a first through hole, wherein the bottom plate has a second through hole arranged in a middle position between the two sliding notches and opposite the first through hole when the fixing feet of the cord fastener main body pass through the corresponding sliding notches.

6. The cord fastener according to claim 5, wherein the first bulge and the second bulge are both flanges, or the first bulge is a flange and the second bulge is a bump, or the first bulge is a bump and the second bulge is a flange.

7. The cord fastener according to claim 5, wherein the cord fastener main body comprises a female fastener part and a male fastener part, wherein the fixing feet and the first through hole are arranged on the female fastener part, wherein the female fastener part has a fourth through hole in communication with the first through hole, wherein the male fastener part is telescopically arranged in the fourth through hole via a spring, wherein the male fastener part has a fifth through hole, and wherein when the male fastener part is subjected to a pressing action, the fifth through hole thereof is in communication with the first through hole.

* * * * *